2,741,056

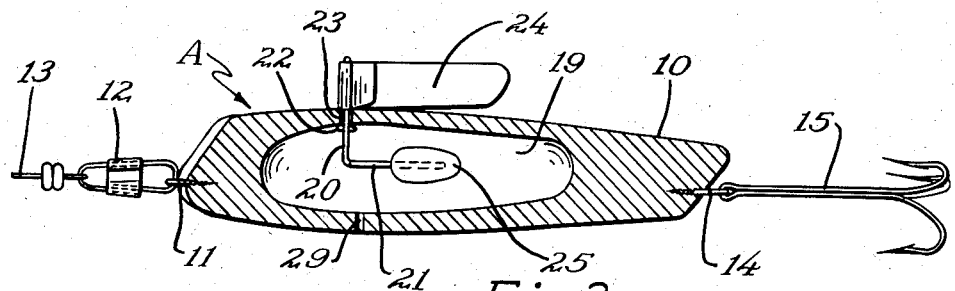
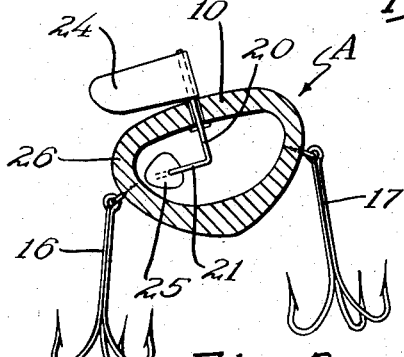
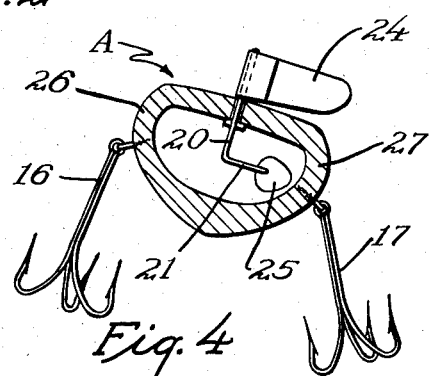
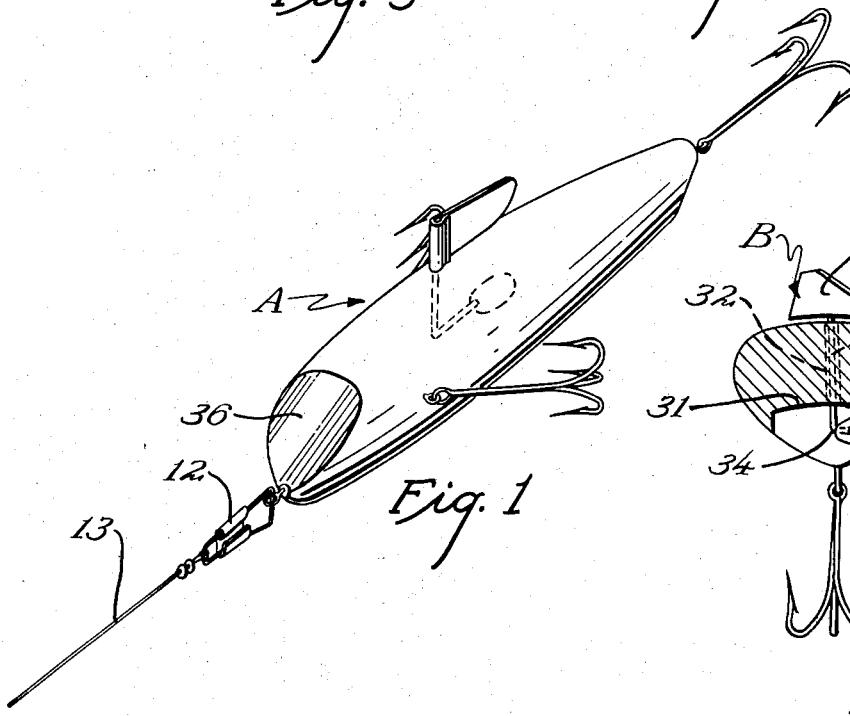
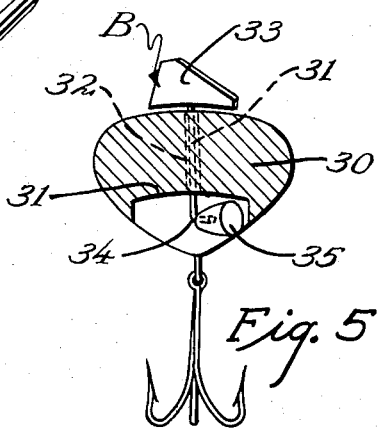
INVENTOR.
John J. Sullivan
Lester H. Martell
BY Robert M. Dunning
ATTORNEY United States Patent Office 2,741,056
Patented Apr. 10, 1956

FISHING LURES

John J. Sullivan and Lester H. Martell, St. Paul, Minn.

Application May 21, 1951, Serial No. 227,487

7 Claims. (Cl. 43—42.03)

This invention relates to an improvement in fishing lures and deals particularly with a lure having a life-like movement as it is drawn through the water.

Various types of lures have been provided with means for producing a wobbling movement of the lure as it is drawn through the water. The present invention deals with a structure of this general type. However, in the present device the lure body changes direction almost continuously and tilts first to one side and then to the other to produce a life-like appearance.

An object of the present invention lies in the provision of a lure having a vane capable of tilting the lure body substantially about its longitudinal axis and in supporting this vane on a pivot shaft which may extend vertically when the lure is in an intermediate position. This pivot is provided with a crank arm having a weighted end. As the lure tilts slightly in one direction, the weighted crank arm falls toward the lower side of the lure, pivoting the vane in a direction to twist the lure body substantially about its longitudinal axis through a center or vertical position. As the lure body passes center position and tilts in the opposite direction, the weighted arm falls toward the opposite side of the lure body, thus reversing the twisting action upon the lure. As the weighted arm ordinarily does not function until the lure tilts in one direction, substantially out of vertical position, the lure will wobble or twist through a considerable angle as it moves forwardly.

A feature of the present invention lies in combining an automatically operable vane with a means of guiding the forward end of the lure downwardly when the lure is in vertical position. As the lure twists about its longitudinal axis, it is moved first in one direction and then in the other so as to follow a zig-zag path as it moves through the water.

These and other objects and novel features of the present invention will be more clearly and fully set forth in the following specification and claims.

In the drawings forming a part of the specification:

Figure 1 is a perspective view showing the lure in readiness for operation.

Figure 2 is a longitudinal section through the lure body showing the arrangement of the parts.

Figure 3 is a cross-sectional view through the lure showing the lure body tilted in one direction.

Figure 4 is a sectional view similar to Figure 3 showing the lure body tilted in an opposite direction.

Figure 5 is a cross-sectional view through a modified form of construction of lure.

The lure is indicated in general by the letter A and may be varied considerably in outside shape or form. In the particular form illustrated the lure includes an elongated body 10 having a fastening means 11 at the forward end thereof designed for attachment with a clip such as 12 attached to a fishing line 13 or to a swivel or leader fastened to the fishing line. The clip 12 is of common type and is often used to provide a means of detachably connecting the fishing line to the lure.

A second fastening means such as 14 is usually provided near the rear end of the body 10 and is designed to accommodate a multiple hook unit such as 15. Other hooks such as 16 and 17 may be connected to the lure body on opposite sides thereof, or a single hook may be suspended from the center point of the bottom of the lure, the location of these hooks being a matter of individual preference rather than an important part of the present invention.

The body 10 is shown as having a chamber 19 inwardly thereof. A pivot 20 having an angularly bent end 21 extends through the wall of the chamber 19, preferably at the top extremity of the lure body. In other words, the pivot 20 is usually located on a vertical plane through the axis of the lure when the lure is in an upright or intermediate position. A shoulder 22 may be provided on the pivot 20 so as to hold the pivot from extensive longitudinal movement through the aperture 23 in the lure body. A vane 24 is supported upon the pivot 20 externally of the lure body. This vane 24 is preferably arranged in substantially the plane of the pivot extremity 21. A weight 25 of lead or other suitable material is provided on the bent extremity 21 of the pivot 20. The vane 24 is secured to the pivot in such a manner as to pivot in unison therewith.

When the lure is placed in the water and is tilted to one side or the other of intermediate or upright position the weight 25 on the pivot arm 21 acts as a crank to oscillate the pivot 20, the weight 25 moving toward one side wall 26 of the lure body 10 as indicated in Figure 3 of the drawings. The weight 25 has a tendency to hold the lure body in the tilted position shown in Figure 3. However, the vane 24 which is in substantially the same plane as the pivot arm 21 causes a tendency for the lure body to twist about its longitudinal axis as it is drawn forwardly in the water. Thus the vane 24 acts against the tendency for the lure to remain tilted in the position shown in Figure 3 and twists the lure body in a clockwise direction about its axis from the position shown in Figure 3 until it swings past center position. When the opposite side 27 of the lure body swings considerably lower than the side 26, the weight 25 swings toward the opposite side 27 as shown in Figure 4 of the drawings, tilting the vane 24 into a second extreme position.

Inertia and friction keep the weight 25 from swinging until the body has tilted through a substantial angle. However, once it tilts into the position shown in Figure 4, it tends to remain in this position until it is again twisted substantially beyond intermediate position toward the opposite position shown in Figure 3. When the vane 24 is in the position shown in Figure 4, the tendency for the lure to twist in a clockwise direction ceases and the tendency for the lure to twist in a counter-clockwise direction is created.

The body of the lure is usually provided with apertures such as 29 so as to permit the inner chamber to fill with water thus preventing the lure from being buoyed upwardly by air within the body.

In Figure 5 of the drawings, we disclose a modified form of construction in which the crank arm supporting the weight is located in a notch or cavity on the undersurface of the lure. In this form of construction the lure body 30 is provided with a recess 31 which is shown in the undersurface of the lure body. A pivot 31 extends vertically through an aperture 32 in the lure body 30, the pivot extending vertically when the lure is in central or upright position. A vane 33 is secured to the upper end of the pivot 31 to rotate in unison therewith. The pivot 31 is provided with an angularly extending crank arm 34 which supports a weight 35 of any suitable type.

The lure B illustrated in Figure 5 of the drawings may simulate the lure A in other respects and may comprise an elongated body having means at one end thereof for attachment with a fishing line and the lure body may be provided with suitable hooks.

The lure B operates in the same manner as the lure A. When the lure body tilts so that the pivot 31 swings out of vertical position, the weight 35 will swing downwardly to one side or the other. This swings the vane 33 into proper position to twist the lure body about its longitudinal axis through center or vertical position. This causes the vertical pivot to tilt in the opposite direction and the weight 35 will then swing to its other extreme position. In other words, the operation of the weight oscillates the lure body about its longitudinal axis first in one direction and then the other. Friction and inertia permit a relatively wide oscillation of the lure.

As indicated in Figures 1 and 2 of the drawings, the lure body of either lure A or lure B may be provided with a grooved inclined forward surface 36 which tends to direct the lure body downwardly on a vertical plane through the axis of the body when the body is in upright or intermediate position. As the body oscillates the direction toward which the lure is guided also changes so that the lure body tends first to move to the right of a straight path and next to the left of a straight path. This zig-zag path combined with the ocillating movement of the lure body about the longitudinal axis of the lure creates an extremely life-like movement as the lure is drawn through the water.

It is desired to have it understood that obvious changes may be made within the scope of the following claims without departing from the spirit of the invention.

We claim:

1. A lure including an elongated lure body, means at one end of said body designed for attachment to a fishing line, crank means pivotally supported in said lure body for pivoting about an axis extending substantially at right angles to the longitudinal axis of said lure body, said crank means including a crank arm having a weight fixedly carried thereupon within the confines of said body, and a vane fixedly secured to the crank means and pivotal therewith externally of the body, whereby pivotal movement of said weighted crank arm acts to pivot said vane.

2. The structure described in claim 1 and in which the lure body is provided with a chamber therein within which said crank arm and weight are located.

3. The structure described in claim 1 and in which the lure body is partially hollow, and said weighted crank arm is located in the hollow interior of the lure.

4. A fishing lure including an elongated body having means adjacent one end thereof designed for attachment to a fishing line, a pivot pivotally supported by said lure body intermediate the ends thereof, the axis of said pivot intersecting the longitudinal axis of the lure body within the confines thereof, a crank arm extremity on said pivot extending angularly therefrom, a weight fixedly positioned on said crank arm extremity, and a vane on said pivot extending above the top extremity of said lure body, said vane being arranged in substantially the plane of the crank arm extremity carrying said weight and pivotal therewith by the movement of the weight.

5. The structure described in claim 4 and including a grooved forward end on said lure body.

6. A fishing lure comprising an elongated lure body, means at one end of said body designed for attachment to a fishing line, crank means pivotally supported by said lure body having an integral leg portion extending therefrom intermediate the ends of said lure body and disposed in a vertical plane through the axis of the lure, said crank means including a crank arm having a weight fixed thereupon and with said crank means being pivotal about a substantially vertical axis in upright position of the lure when the longitudinal axis of the lure body is substantially horizontal, and a vane extending outside the confines of the lure body secured to the said leg portion of the crank means and pivotal therewith, the pivotal movement of said weighted crank arm acting to pivot said vane.

7. A lure body including an elongated lure body provided with a recess in the surface thereof, means at one end of said body designed for attachment with a fishing line, crank means pivotally supported in said lure body, said crank means including a bent arm defining a plane and having a weight fixedly carried thereupon in said recess, and a vane fixedly secured to the crank means externally of the confines of said lure body in substantially the plane of the said bent arm and pivotal in unison therewith, the pivotal movement of said weighted crank arm acting to pivot said vane upon tilting of said lure from one side to the other in a submerged condition.

References Cited in the file of this patent

UNITED STATES PATENTS

| | | |
|---|---|---|
| 781,794 | Smith | Feb. 7, 1905 |
| 974,050 | Garrison | Oct. 25, 1910 |
| 1,361,602 | Marks | Dec. 7, 1920 |
| 1,762,914 | Cornelius | June 10, 1930 |
| 1,813,370 | Villatore et al. | July 7, 1931 |
| 2,036,946 | Malecek | Apr. 7, 1936 |
| 2,038,829 | Cronin | Apr. 28, 1936 |
| 2,448,523 | Fibiger | Sept. 7, 1948 |